June 14, 1960 K. GOSSLAU 2,941,152

IMPULSE TIMING SYSTEM AND DEVICE

Filed Sept. 22, 1954 4 Sheets-Sheet 1

Inventor:
Karlheinz Gosslau.

By. [signature] Atty.

June 14, 1960 K. GOSSLAU 2,941,152

IMPULSE TIMING SYSTEM AND DEVICE

Filed Sept. 22, 1954 4 Sheets-Sheet 2

Inventor:
Karlheinz Gosslau.

By [signature] Atty.

Inventor:
Karlheinz Gosslau
By. [signature] Atty

June 14, 1960 K. GOSSLAU 2,941,152

IMPULSE TIMING SYSTEM AND DEVICE

Filed Sept. 22, 1954 4 Sheets-Sheet 4

Inventor:
Karlheinz Gosslau
By: [signature] Atty.

United States Patent Office 2,941,152

Patented June 14, 1960

2,941,152

IMPULSE TIMING SYSTEM AND DEVICE

Karlheinz Gosslau, Munich, Germany, assignor to Siemens & Halske Aktiengesellschaft, Munich and Berlin, Germany, a German corporation Filed Sept. 22, 1954, Ser. No. 457,708

Claims priority, application Germany Sept. 24, 1953

6 Claims. (Cl. 328—48)

This invention is concerned with a system for timing impulses.

The problem of timing impulses, that is to say, of shifting impulses as to time, arises often in electrical communication, particularly in electronic communication. Relatively short time shifts can be effected by means of delay lines which may, for example, be made up of a series of reactance elements. The so-called inductance coil chains constitute an example of this type of delay line. The amount of time shift obtainable with such a delay line depends on the number of its constituent elements. Thus, where a time shift of relatively large magnitude is desired, a large number of reactance elements will be required. Not only does this necessitate the use of accurately tuned capacitances and inductances, but each reactance element also causes a certain degree of distortion of the impulse to be transmitted. This distortion is cumulative along the delay line, and with a large number of reactance elements unduly large distortions may result. Moreover, any delay line of this nature causes a reduction in pulse energy with increasing numbers of constituent elements. A further disadvantage of the conventional delay lines resides in that the accuracy of time shifts obtainable therewith depends on the quality of the individual inductances and capacitances, and more specifically on the accuracy of tuning and on their constancy over a period of time. With long delay lines for large time shifts, there always exists some measure of uncertainty as to repeatability of the time shift, since a large number of circuit elements affects the accuracy of the system.

The invention hereinafter described operates in accordance with a known method of obtaining time shafts of any desired length without impairing either accuracy or pulse shape. The invention resides in causing an impulse counter, adapted to transmit an output pulse after having received a predetermined number of input pulses, to be supplied with a series of impulses derived from a pulse generator, starting from the moment when an impulse to be shifted as to time arrives, until the impulse counter transmits an output pulse. The frequency of this series of impulses and the number of impulses receivable by the counter before an output pulse is transmitted, are correlated in such a manner that the time interval between the impulse to be shifted as to time, and the output pulse of the impulse counter, at least approximately equals the desired time shift.

In contrast to the conventional timing chains, the constituent elements of the impulse counter do not affect the accuracy of the time shift since this accuracy depends solely on the constancy as to time of the pulse generator. This element in turn is independent of the capacity of the impulse counter, that is, of the number of impulses which the counter can receive before transmitting an output pulse, and is thus independent of the time shift itself.

The invention will be better understood from the following description with reference to the accompanying drawings, in which.

Figure 1:
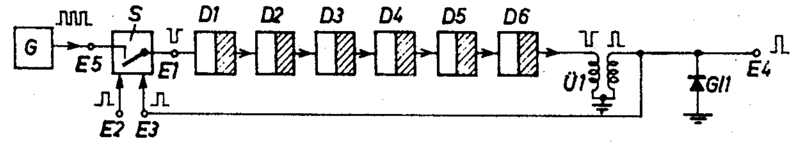
Fig. 1 is a block diagram of a circuit arrangement for carrying out the invention.

Referring to Fig. 1, the impulse counter is composed of six series-connected binary counter stages D1 to D6. As is well known, such binary counter stages can occupy only two positions, namely the position of rest (normal position) and the counting position. In this figure and throughout the drawings, the position occupied by any binary counter stage is indicated by shading one half thereof, shading of the right half designating the normal position while the left half indicates the counting position. Switching-over from one position to the other is initiated by an input pulse of predetermined polarity. When the binary counter stage changes over from the counting to normal position, it simultaneously transmits from its output side a pulse of the same polarity. Thus, when an impulse is fed to the input side of such a binary counter stage while the latter is at normal, it will switch over to the counting position. When a further pulse is fed in, the counter stage will return to the normal position while transmitting a pulse from its output side. If a plurality of such dual counter stages are connected in series, as shown in Fig. 1, each stage, upon receiving two pulses, will transmit one pulse to the next succeeding stage. Assuming there are $n$ dual counter stages, it follows that the input end of the impulse counter consisting of these series-connected binary counter stages, that is, the input side of the first stage D1, must receive $2^n$ pulses if the output end of the counter, that is, the output side of the final stage D6, is to transmit one pulse. Thus, with the six stages provided in Fig. 1, a total of $2^6$ or 64 impulses must be received in order for the impulse counter to produce one impulse at the output terminal E4. Corresponding computations of course apply to the output sides of the individual stages of the impulse countter; for example, one pulse will be transmitted from the output side of the fourth dual counter stage D4 when $2^4$ or 16 pulses have been fed to the input terminal E1 of the pulse counter.

The positions occupied by the individual binary counter stages of such a counter after a predetermined number of impulses has been received, may be determined by the following analysis: When an impulse is fed to the impulse counter in its position of rest, it first causes switching of the first stage from the normal position to the counting position; the second impulse returns the first stage to normal position while an impulse is transmitted to the second stage, switching the latter to counting position, etc. Hence, the following rule may be stated: The number $z$ indicated by any binary counter stage of an impulse counter, complies with the equation $z=2^{(n-1)}$ wherein $n$ designates the ordinal number of such stage. For example, if the fourth stage is in counting position, it will indicate the number $z=2^{(4-1)}=8$. The total number of impulses received by the impulse counted is obtained by adding the numbers indicated by the individual stages.

The input E1 of the impulse counter is connected through a switch S with a pulse generator G. The switch S has two terminals E2 and E3 to which impulses are to be applied for closing and opening the switch. An impulse supplied to terminal E2 causes closure of the switch while a pulse arriving at E3 opens the switch. Terminal E3 is connected with the output terminal E4 of the impulse counter.

This circuit arrangement operates as follows:

When an impulse to be shifted as to time is transmitted to terminal E2, this impulse causes closure of switch S, whereupon the impulses transmitted at E5 by the pulse generator G can be received at the input terminal E1 of the impulse counter. The binary counter stages will then be switched in succession until the 64th input pulse causes an output pulse to be transmitted from binary counter stage D6. This impulse issuing from the output terminal E4 of the impulse counter is transmitted to terminal E3 of switch S and opens the latter, thus interrupting the feeding of pulses supplied by generator G to the impulse counter. At the same time, the impulse formed at the output terminal E4 constitutes the desired time-shifted impulse, since between the occurrence of an impulse at terminal E2 and the transmission of an impulse at the output terminal E4 there is a time interval of 63 periods of the pulse frequency of generator G, these 63 periods being defined by the first and last of the 64 impulses received by the impulse counter. Thus, the magnitude of the time shift is governed by the pulse frequency and the capacity of the impulse counter, amounting to 64 impulses in the present example.

Following the last binary counter stage D6, Fig. 1 shows a transformer U1 and a rectifier G1–1. Furthermore, impulses of definite polarity have been indicated at the various terminals. The purpose of these circuit elements and the indicated polarity of the impulses will be understood from the following detailed description of the construction of the dual counter stages D1 to D6 and the switch S.

Figure 2:
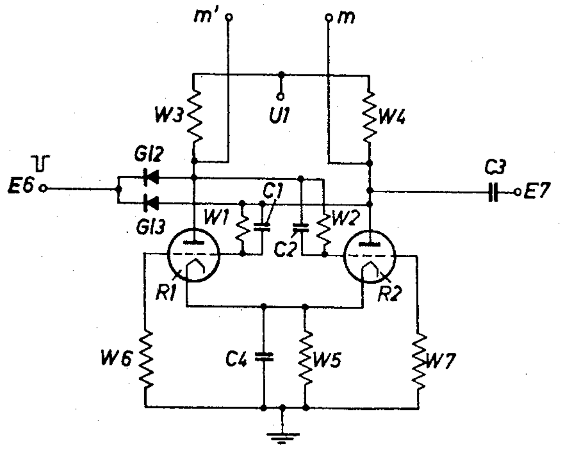
Fig. 2 illustrates the circuit for a binary counter stage, known per se, adapted to be employed in lieu of any of the binary counter stages $D_1$ to $D_6$ shown in Fig. 1.

Fig. 2 shows the circuit of a conventional binary counter stage which may correspond to any one of the binary counter stages D1 to D6 illustrated in Fig. 1. This binary counter stage constitutes a switching circuit comprising the two electronic tubes R1 and R2. The plate of each tube is connected to the grid of the other tube through an RC circuit W1, C1 and W2, C2 respectively. The tubes are connected to the common supply voltage U1 through anode resistors W3 and W4 respectively. The two tubes have a common cathode resistor W5 which is bridged by a capacitor C4 so as to maintain the potential drop across resistance W5 upon flow of plate current, for the period of time required for the switching-over from one position to the other. The potential drop across cathode resistor W5 is applied as a grid bias to the grids of both tubes R1 and R2 through grid discharge resistors W6 and W7 respectively. The circuit has an input terminal E6 which is connected to the grids of tubes R1 and R2 through respective rectifiers G1–2 and G1–3. These rectifiers have the effect that only impulses of a predetermined polarity can affect the circuit. With the rectifiers inserted in the direction as shown, these impulses will be of negative polarity in the example illustrated.

This circuit operates as follows:

In the position of rest, the tube R2 is conductive. Due to the potential drop across resistor W4, the plate of this tube has a relatively low potential applied thereto. Tube R1 is nonconductive because of the potential drop across cathode resistor W5. This potential drop is communicated also to the grid of tube R2, but this grid is at a higher potential than that of tube R1, because there is no potential drop across plate resistor W3 (tube R1 being nonconductive), so that a higher potential is applied from the plate of tube R1 to the grid of tube R2 than the potential applied from the plate of R2 to the grid of R1. This position is accordingly maintained stable. Analogous considerations apply to the counting position in which tube R1 is conductive and R2 is nonconductive.

If, while the circuit is in the position of rest (with tube R2 conductive), a negative impulse of adequate voltage is applied to the input terminal E6, tube R2 will become nonconductive under the influence of this impulse. This raises the potential at the plate of tube R2. Because of the action of capacitor C1, there will then be a positive impulse at the grid of tube R1, rendering the latter conductive. The circuit has thus been switched from the normal position to the counting position. The raising of the potential at the plate of tube R2 furthermore produces a positive impulse at the output terminal E7 of the circuit, which terminal is blocked against D.C. voltages by capacitor C3. This positive impulse is ineffective if a similar binary counter stage is connected to the output terminal E7 since the rectifiers of such succeeding stage, corresponding to the rectifiers G1–2 and G1–3, block the stage against the reception of positive impulses. If, on the other hand, the binary counter stage illustrated constitutes the final stage of an impulse counter, that is, stage D6 in the example of Fig. 1, it becomes necessary to suppress this impulse if it is desired that only impulses of uniform polarity appear at the output end of an arrangement as shown in Fig. 1.

To this end, the rectifier G1–1 has been provided in the circuit according to Fig. 1. Whenever stage D6 in Fig. 1 transmits a positive impulse, the polarity of this impulse is reversed by the action of the transformer U1, whose operation will be explained below in connection with Fig. 3. Accordingly, the pulse appears as a negative pulse on the secondary side of transformer U1 and is there short-circuited by the rectifier G1–1. Consequently, there will be no actuation of the switch S through terminal E3.

If a circuit according to Fig. 2, while in counting position (tube R1 conductive), receives a negative impulse at terminal E6, the circuit will be switched back to its position of rest in the manner described. Tube R2 is changed from the nonconductive to the conductive condition. This causes a drop in the potential of its plate, resulting in a negative impulse at the output terminal E7. Such a negative impulse is capable of switching a succeeding counter stage. Thus, the succeeding stage is switched only after the preceding stage has received two negative impulses. If the binary counted stage constitutes the final stage of the impulse counter (stage D6 in Fig. 1), the negative output pulse is reversed by transformer U1 into a positive pulse which can be taken off the output terminal E4 in its full magnitude since rectifier G1–1 remains blocked in this case. Thus, the circuit illustrated in Fig. 1 receives positive pulses at its terminal E2 and transmits time-shifted impulses of the same polarity at its output terminal E4.

Figure 3:
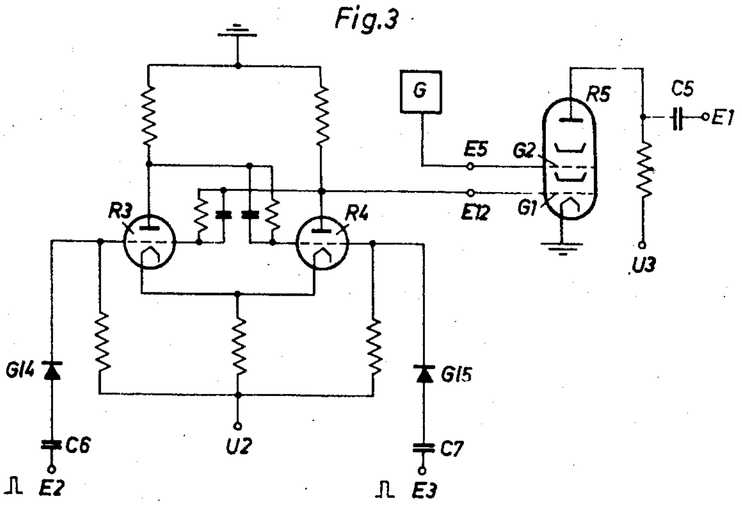
Fig. 3 is a circuit diagram for one embodiment of the switch designated S in Fig. 1.

The circuit represented in Fig. 3 illustrates an embodiment of the switch S diagrammatically indicated in Fig. 1. The switch S comprises a change-over switching circuit which in principle substantially corresponds to the switching circuit of Fig. 2. The switching circuit of Fig. 3 includes the terminals E2 and E3, corresponding to the terminals of Fig. 1 having the same reference characters. Each of these terminals is connected to the grid of one of the tubes R3 and R4, such connection including a capacitor C6 or C7 for blocking off direct currents, and a rectifier G1–4 or G1–5. The rectifiers are so polarized that only positive impulses can reach the grids of tubes R3 and R4. If a positive pulse is supplied to one of these tubes while such tube is nonconductive, the switching circuit changes over in the manner described with reference to Fig. 2. If the pulse is received by a tube while the latter is already conductive, the pulse remains without effect.

As shown, the plate of tube R4 is connected directly with the grid G1 of a multiple grid tube R5. The grid G2 of the latter is connected with the output terminal E5 of the pulse generator G. The tube is of such design that positive potentials must be applied to both of its grids to render the tube conductive. Thus, as long as a positive potential is applied to grid G1 of tube R5 from the plate of tube R4, the positive pulses from generator G will make the tube R5 conductive. In this case, the plate of tube R5 and thus the input terminal E1 of the impulse counter have pulses applied thereto which are of negative polarity because of the phase relationship between grid and plate potentials. Terminals E1 and E5 correspond to the terminals of Fig. 1 bearing the same reference characters. The feed voltages U2 for the switching circuit and U3 for the multiple grid tube R5 are so selected that when tube R4 is conductive due to low anode potential, tube R5 will be nonconductive, while when tube R4 is cut off due to high anode potential, the grid G1 of tube R5 has a positive bias.

This circuit operates as follows:

Assuming a condition in which the tube R4 is conductive and hence multiple-grid tube R5 is blocked; if, then, a positive impulse is applied to terminal E2, the circuit will be switched over whereby the tube R4 becomes nonconductive and a positive bias is applied to grid G1 of tube R5. Consequently, the impulses of negative polarity, supplied by pulse generator G, will be received at the input terminal E1 of the impulse counter, which is blocked against D.C. voltages by capacitor C5. As already explained, only pulses of this (negative) polarity are usable by the impulse counter. A positive impulse supplied to terminal E2 thus causes closing of the switch. If, while in this condition, a positive impulse is supplied to terminal E3, the circuit will switch back to its original condition, with tube R4 becoming conductive again. Consequently, tube R5 becomes nonconductive and cuts off any further transmission of pulses. In other words, a positive pulse applied to terminal E3 causes opening of the switch.

Figure 4:
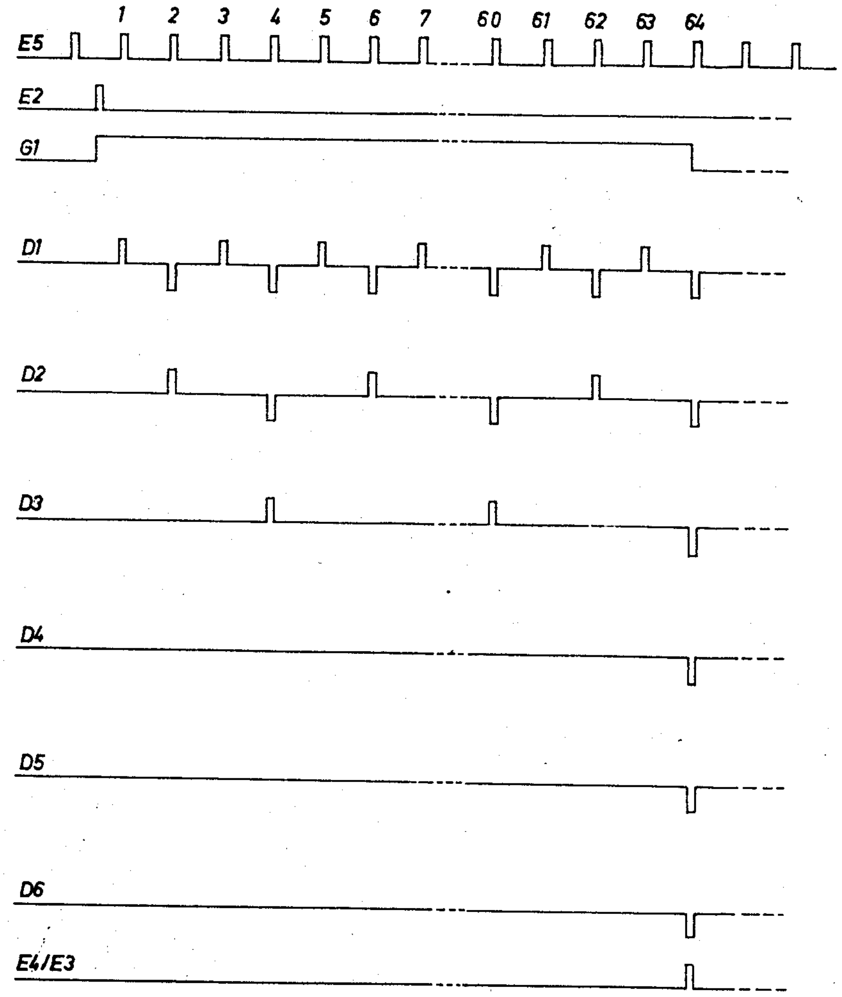
Fig. 4 is a diagram showing the time sequence of the electrical phenomena occurring in a circuit according to Fig. 1.

Fig. 4 illustrates the sequence of the electrical phenomena occurring in a circuit according to Fig. 1, as a function of time. To simplify the illustration, only those phenomena have been shown which occur shortly after the occurrence of a pulse to be time-shifted, and those occurring shortly before transmission of the time-shifted impulse. The intervening time interval, omitted from the figure, has been representated by broken lines.

Opposite reference character E5 are illustrated the pulses appearing at the input terminal E5 of switch S, while opposite reference character E2 is shown an impulse to be shifted as to time. The moment this impulse arises, it causes closing of the switch S. As long as this switch is closed, the grid G1 of the multiple grid tube R5 of Fig. 3 has a positive potential applied thereto. The grid potential, as a function of time, is plotted opposite reference character G1 in Fig. 4 and illustrates the moment of switch closure. The next six lines of Fig. 4 show the electrical phenomena at the input and output terminals of the individual binary counter stages. Reference characters D1 to D6 designate the graphs of the impulses occurring at the output terminals of the corresponding designated stages and thus also at the input terminals of the next following stages.

As will be seen, in binary counter stage D1, each pulse coming from the pulse generator after the occurrence of an impulse to be time-shifted, causes switching-over of this stage, so that impulses of alternating polarity will arise at the output of stage D1 in step with the pulse series shown opposite E5. The first such impulse will be of positive polarity since the impulse counter was assumed to be initially in the position of rest. Since only the negative pulses actuate the next-succeeding counter stage, the impulses shown opposite D2 are spaced apart twice the spacing of those shown opposite D1. Each negative output pulse from D2 in turn switches D3. Since the spacing of the D3 pulses is again twice that of the D2 pulses, the illustrated time interval immediately following the occurrence of an impulse to be time-shifted contains only a single positive pulse. A positive and a negative impulse is shown in the represented time interval shortly before delivery of an impulse shifted as to time. Of the pulses arising at the outputs of stages D4, D5 and D6, only the very last negative pulse has been shown, which coincides with the 64th pulse of pulse generator G and which returns the impulse counter to its normal position. The impulse at the exit of D6 is reversed in polarity by the action of transformer U1 in Fig. 1 and the reversed pulse is transmitted from terminal E4 to terminal E3 of switch S, thus opening this switch. This pulse is shown opposite the reference character E4/E3 in Fig. 4.

Given a pulse generator with a fixed pulse frequency, such a circuit arrangement permits of obtaining time shifts corresponding to the product of the time-spacing of the pulses $t$ and the capacity of the impulse counter $2^n$, or $2^n.t$. Moreover, any remaining inaccuracy will be the smaller, the greater the capacity of the impulse counter. Such inaccuracy may result from the fact that the impulse to be time-shifted may arrive at any moment intermediate two pulses of the pulse generator. This inaccuracy can be eliminated by deriving the impulse to be time-shifted from one of the pulses of the pulse generator. This affords an unequivocal starting time for the succession of phenomena described in detail above.

In the electronic communication art there is frequently posed the requirement to shift an impulse of a series delivered by an impulse generator, by 100 periods. Special means are required for this purpose because the above described circuit principle permits a shifting by $2^n$ impulse periods, that is, for example, by 64 or 128 impulse periods.

In accordance with the invention, this special means comprises six series-connected binary counter stages, with the output impulse of the final stage (after 64 input pulses) being employed for the purpose of connecting the output of the penultimate or fifth counter stage with a delay line. The next-following output impulse of that fifth stage (following another 32 input pulses, for a total of 96 input pulses) is then transmitted to the delay line. The delay line is arranged to effect a time shift by five cycles. This results in a total time shift of $95+5=100$ periods, as 96 pulses define therebetween a period of 95 periods. The output pulse of the penultimate counter stage is not only transmitted to the delay line but is also used for interrupting the supply of further pulses from the pulse generator to the impulse counter since the production of the output pulse completes the task of the impulse counter.

To restore the entire arrangement to its normal condition, impulses tapped off from the delay line are used to break the connection between the output of the penultimate counter stage and the delay line and to return the final counter stage to its normal position. This is necessary because the impulse counter had not completed its second counting cycle, and the output pulse of the penultimate binary counter stage had switched the final stage to its counting position from which it must now be returned to the normal position.

Figure 5:
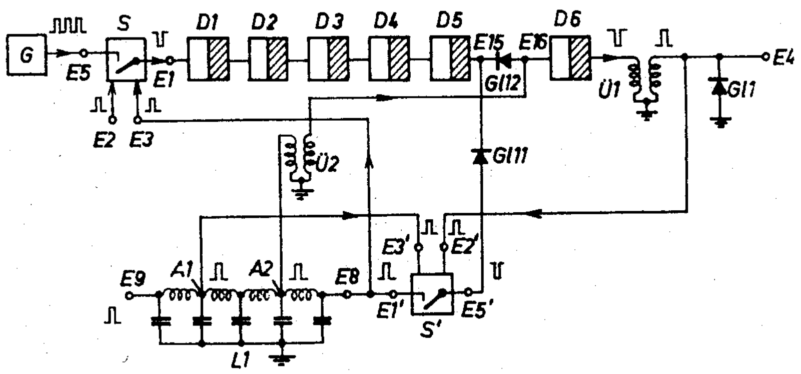
Fig. 5 is a block diagram, similar to Fig. 1, but showing a modified circuit arrangement.

Fig. 5 illustrates an example of a circuit arrangement operating in accordance with the foregoing explanations.

As in Fig. 1, this circuit includes a generator G, a switch S and an impulse counter comprising the six binary counter stages D1 to D6. Similar component parts have been designated with the same reference characters as in Fig. 1. In contrast to the circuit according to Fig. 1, in Fig. 5 the output of the penultimate counter stage D5 is connected to the input terminal E8 of a delay line L1 by way of a switch S'. This switch is controlled by the output pulses of the final counter stage D6 and also by the impulses obtained from a first tap A1 of the delay line L1. The switch S' may be of the same construction as the switch S in Fig. 1, and therefore its terminals have been correspondingly designated. Thus, terminal E2' receives the output pulses of the final binary counter stage D6 (after polarity reversal by transformer U1, as in Fig. 1) which pulses cause closure of the switch. The impulses obtainable at tap A1 of delay line L1 are transmitted to terminal E3' and cause opening of the switch S'.

After 96 incoming pulses, the output pulse is adapted to be taken off at the output end of counter stage D5, and this completes the task of the impulse counter. In order then to be able to interrupt the feeding of further pulses from the generator G to the impulse counter, a connection is provided from the terminal E1' of switch S' to the terminal E3 of switch S. Thus, the output pulse transmitted by switch S' from counter stage D5 acts upon switch S and opens the latter.

Ahead of the tap A1 of delay line L1, a second tap point A2 is provided and is connected through the transformer U2 to the input side of the final counter stage D6. The impulse transmitted through this connection serves to restore the stage D6 from its counting position to its normal position.

This circuit operates as follows:

When an impulse to be time-shifted is applied to the terminal E2 of switch S, the latter is closed in the manner already described before. Thereupon the impulse counter is fed with the pulses supplied by generator G until the impulse counter transmits an output pulse at its output terminal E4. This output pulse, initiated by the 64th impulse fed into the counter, closes switch S'. Consequently the next-following output pulse of counter stage D5, initiated by the 96th input pulse fed to the counter, can reach the input terminal E8 of the delay line L1 which transmits from its output terminal E9 the desired output impulse, shifted by 100 periods. From the moment when the output pulse of counter stage D5 is supplied to the delay line L1, the connection between pulse generator G and impulse counter must be interrupted since the operation of the latter is then completed. Therefore, an impulse causing switch S to open, is taken off in back of switch S', that is at terminal E1' or at the input terminal E8 of delay line L1, and is transmitted to terminal E3 of switch S. This terminates the impulse shifting operation proper, and all that remains to be done is to return the circuits to their normal position, as switch S' is still closed, and counter stage D6 still is in counting position to which it had been switched by the output pulse from stage D5.

For reasons which will be explained below, the counter stage D6 must first be restored to the normal position. This is effected by means of the pulse obtained at the tap A2 of the delay line L1, which pulse is positive and is reversed in polarity by transformer U2. The negative pulse from transformer U2 is fed to the input side of counter stage D6 and acts on the latter in the same manner as an output pulse of stage D5 would act. It thus returns the final counter stage D6 to its normal position.

In order to prevent this negative pulse from being simultaneously fed back to the input side E8 of delay line L1 through rectifier G1–11 and the closed switch S', a rectifier G1–12 is interposed between the terminals E15 and E16 to which the rectifier G1–11 and the transformer U2 are respectively connected. This interposed rectifier G1–12 is of such polarity that a negative impulse cannot be transmitted back from terminal E16 to terminal E15. The sequence of terminals E15 and E16 must be as stated, for the reasons indicated above. The binary counter stage D6 transmits an output pulse which reaches the terminal E2' of switch S' but remains ineffective since this switch still is in its operative condition, and the pulse cannot change this. After this operation has been terminated, the tap A1 of the delay line L1 receives an impulse which is transmitted to terminal E3' of switch S', causing this switch to open. If the conductors connected to taps A1 and A2 had been interchanged, thereby causing the switch S' to open first and the counter stage D6 to be restored only thereafter, then the output pulse of this stage, initiated by the restoring action of this stage, would have closed switch S' again so that the circuits would not have been restored to their normal position.

From the explanations with reference to Fig. 3, it is apparent that switch S reverses the polarity of the pulses of pulse generator G. At the 96th input pulse, switch S' receives from the output of counter stage D5 a negative impulse and converts it into a positive impulse, provided, of course, that a circuit as shown in Fig. 3 is employed as the switch S'. Tube R5 of Fig. 3 operates thereby as follows: While switch S' is open, a positive potential is applied to terminal E12 so that tube R5 is nonconductive even though a positive potential may be applied to grid G2 of this tube. A negative impulse fed to terminal E5 lowers this potential and makes the tube nonconductive for the duration of the impulse, thereby producing a positive impulse at output E1. Accordingly, a positive impulse has been indicated at terminal E1' in Fig. 5.

Before the stage D5 produces a negative impulse with the arrival of the 96th input pulse, a positive impulse occurs at the output of this stage, namely, at the moment of switch-over from the normal position to counting position. This action is initiated by the 80th input pulse, that is, at a time when switch S' is closed. In order to prevent such a positive impulse from being transmitted further and reaching the output E9 of the delay line L1, the rectifier G1–11 is provided which is of such polarity as to block the transmission of positive pulses.

In order to have the time shift, obtained by the impulse counter, approximate as closely as possible the total time shift desired, a modified operation may be advantageously employed. According to this modification, the impulse counter is preset prior to the occurrence of any impulse to be time-shifted, such presetting being the equivalent of the reception of a predetermined number of impulses. If this presetting is made dependent on the transmission of an output impulse by the impulse counter, this presetting will recur with each output pulse once the first impulse to be shifted has been received. The number of impulses which the impulse counter can still receive after being preset, is a criterion of the total time shift that can be attained. The necessary presetting for a time shift by a given desired number $p$ of periods of the pulse sequence supplied by the generator, equals the difference J in number of impulses between the capacity $2^n$ of the impulse counter, and that number of pulses which brackets or defines the desired number $p$ of periods, or $J=2^n-(p+1)$, since $p$ periods are bracketed or defined by $(p+1)$ pulses. Of course, the capacity of the impulse counter must be at least equal to that number of impulses which brackets the maximum number of periods contemplated, to permit such time shift to be carried out.

This operation may be illustrated with the aid of a numerical example. Let the capacity of the impulse counter be 64 pulses, corresponding to six binary counter stages ($2^6=64$). A time shift by 20 periods is to be effected. In that case, the difference in impulse numbers J, by which the impulse counter must be preset, is: $J=64-(20+1)=43$, since 21 pulses enclose 20 periods.

It will be understood that the various procedural possibilities discussed above, such as repeated counting-through by the impulse counter, the use of the output pulse of any desired counter stage, the use of a delay line, and presetting of the impulse counter, may be combined with one another with a view of obtaining the desired time shift with the simplest possible equipment.

The presetting method may also be advantageously employed for shifting an impulse by 100 periods of the pulse sequence supplied by the pulse generator. To this end, seven binary counter stages connected in series are employed, with the first, third, fourth and fifth stages being switched from the normal position to counting position by the presetting. This presetting corresponds to the reception of 29 impulses. The seven-stage counter, which, starting with the normal position, would normally transmit an output impulse when receiving the 128th input pulse, is modified by the presetting so as to transmit an output pulse already after 128—29=99 input pulses, corresponding to a time shift of 98 periods as 99 pulses define a time interval of 98 periods. This output pulse is transmitted to a delay line causing a shift by two periods, so as to obtain a total shift of 98+2=100 periods. Since the impulse counter has completed its task after issuing the output pulse, this pulse is employed for interrupting the feeding of pulses from the pulse generator to the impulse counter. In order to again preset the impulse counter after such interruption of the pulse input, an impulse taken off from the delay line is transmitted to the 1st, 3rd, 4th and 5th binary counter stages.

Figure 6:
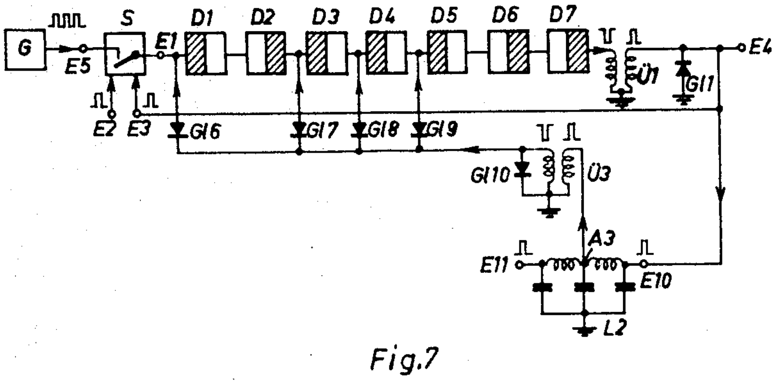
Fig. 6 is a similar representation of a further modification of the circuit arrangement.

Fig. 6 illustrates a circuit arrangement embodying the features last above described. Circuit elements in this figure that correspond to elements of Figs. 1 and 5 have been correspondingly designated, and it is not deemed necessary to repeat the description of their operation. The impulse counter, comprising seven binary counter stages D1 to D7 is connected at its output E4 to the input terminal E10 of the delay line L2. Any impulse passing through this line is tapped off at A3 and reversed in polarity transformer U3. The reversed pulse is transmitted through rectifiers G1–6 to G1–9 to the input sides of binary counter stages D1, D3, D4 and D5. The rectifiers are of such polarity that only negative pulses can be passed from transformer U3 to the counter stages referred to, as only negative pulses are capable of switching these counter stages. The rectifiers prevent the negative impulses, arising at the outputs of the various stages and serving to switch the next-following respective stages, from by-passing these stages and traveling through the above-mentioned connections to switch other stages in an undesirable manner. What these rectifiers cannot, however, prevent, is the passing-on of positive impulses which arise at the outputs of the counter stages as the latter are switched from normal position to counting position (on the assumption that the binary counter stages comprise circuits of the character shown in Fig. 2). To prevent the transmission of these positive pulses to the delay line L2, rectifier G1–10 is provided, which short-circuits any positive potentials conveyed by rectifiers G1–6 to G1–9.

This circuit arrangement operates as follows:

Assuming the impulse counter to be in its preset condition, thus indicating the number 29. If the binary counter stages comprise circuits corresponding to Fig. 2, this means that the left-hand tubes (corresponding to tube R1 of Fig. 2) of stages D1, D3, D4 and D5 are conductive. This has been indicated by shading the left-hand halves of these counter stages. When an impulse to be time-shifted is fed to terminal E2, switch S closes, causing the impulse counter to receive 128—29=99 pulses. The 99th pulse initiates an output pulse at the final counter stage, and this pulse is transmitted to the input terminal E10 of delay line L2, and also to terminal E3 to cause switch S to open. The pulse traveling through delay line L2 emerges at the chain output E11 as a pulse shifted by 100 periods, but before that, it is tapped off at A3 and has its polarity reversed in transformer U3. This polarity reversal is necessary because the output pulse from the impulse counter, transmitted to the delay line L2, is of positive polarity whereas the counter stages can be affected only by negative pulses. The negative pulse derived from transformer U3 is then transmitted, through the rectifiers G1–6 to G1–9, whose function has already been described, to the input sides of counter stages D1, D3, D4 and D5. These stages were returned to their normal position upon transmission of the output pulse from the final stage and opening of switch S; upon arrival of the negative pulses from rectifiers G1–6 to G1–9, however, they are switched back to counting position. The circuit is then again ready for shifting an incoming pulse by 100 periods of the pulse sequence supplied by the pulse generator.

Presetting of the impulse counter for the impulse number differential may also be accomplished with the aid of an impulse storing device to which a number of impulses, depending on the impulse number differential, has been fed. This type of presetting appears particularly indicated when different time shifts are contemplated. This will be apparent from the following explanation.

The presetting may be effected in either of two ways, each employing an impulse storing device and an impulse counter, both consisting of the same number of series-connected binary counter stages.

According to one procedure, the impulse number differential is fed to the storage device, whereupon the positions of the individual stages of the impulse storage device are transmitted to the corresponding stages of the impulse counter. The other procedure resides in feeding to the impulse storage device a number of impulses equal to the desired number of periods, and thereafter transmitting from the individual stages of the impulse storing device to the corresponding stages of the counter the reverse of the positions of these stages. This latter method makes use of the following peculiarity of impulse counters consisting of binary counter stages: The switching over of any stage from its existing position, corresponding to a predetermined impulse number $a$, to the opposite position indicates an impulse number $b$ which corresponds to the equation: $a=2^n-(b+1)$, in which $2^n$ represents the capacity of the impulse counter. For example, if the capacity $2^n$ is 128 pulses and if the impulse counter has been preset by being supplied with $a=29$ pulses, in which case the 1st, 3rd, 4th and 5th stages are in counting position and the 2nd, 6th and 7th stages are at normal (see Fig. 6), and if all stages are then switched over so that the 1st, 3rd, 4th and 5th stages are at rest and the 2nd, 6th and 7th stages are counting, the impulse counter will then indicate an impulse number $b$ of 98 pulses, which satisfies the above equation since $29=128-(98+1)$.

These two procedures of presetting may be explained with the aid of two examples. It will be assumed that a time shift of 60 periods is desired.

According to the first procedure, with a counter capacity of 128 impulses, the impulse storing device must receive 128—61=67 impulses. This results in a well-defined position of the individual binary counter stages of the storing device, namely, counting position for the 1st, 2nd and 7th stages and normal position for the 3rd, 4th, 5th and 6th stages. These positions are transmitted directly to the corresponding stages of the impulse counter, so that the latter is thereby preset to a condition that corresponds to an input of 67 pulses. Now when a pulse to be time-shifted arrives, the impulse counter will transmit an output pulse already after 61 pulses, corresponding to a time shift of 60 periods.

In accordance with the second procedure, it is possible to feed to the impulse storing device that number of pulses which corresponds to the desired number of periods, that is, 60 impulses in the example being considered. The individual stages of the storing device will again occupy well-defined positions whereupon the respective opposite positions are transmitted to the corresponding stages of the impulse counter.

Figure 7:
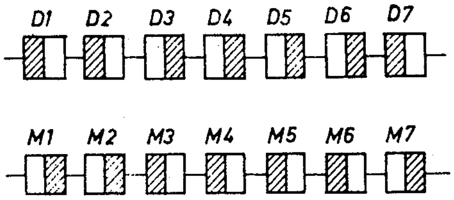
Fig. 7 is a diagram of a circuit employing the principle of impulse storage.

Fig. 7 illustrates an impulse storing device set according to the above example and comprising stages M1 to M7, with corresponding stages D1 to D7 of the impulse counter. The input of 60 pulses has moved stages M3, M4, M5 and M6 of the storing device to counting position, while stages M1, M2 and M7 are at normal. The respective opposite positions are transmitted to the stages of the impulse counter, so that stages D3, D4, D5 and D6 of the latter are at normal and stages D1, D2 and D7 are in counting position. It will be apparent that the impulse counter has thus been set in the same manner as though 67 pulses had been fed to it. If thereafter a pulse to be time-shifted initiates the feeding of a series of pulses to the impulse counter, the latter will transmit an output pulse after 61 pulses, corresponding to a time shift of 60 periods.

The transmission of the true position or of the reverse thereof from the impulse storing device to the impulse counter can be initiated by a special switching operation, for example by a special impulse, or by an output pulse of the impulse counter itself. This last-mentioned procedure is of advantage where a periodically recurring impulse is to be shifted, each time by the same time interval. In that case, it is necessary to effect the storing in the impulse storing device only once, with the result that, starting from the first occurrence of a pulse to be shifted, each transmission of an output pulse by the impulse counter will be followed by presetting of the counter by means of the stored impulses. Since each output pulse causes the entire impulse counter to return to the normal position and this requires a certain amount of time, it is advisable to delay the impulse derived from the output pulse and serving to initiate the presetting operation; this delay should be such that the presetting of the impulse counter will take place in the interval between termination of the output pulse and the arrival of the next pulse from the pulse generator. If that is done, the impulse counter will be preset in sufficient time so that the first pulse to be transmitted from the pulse generator after an output pulse, can be received by the impulse counter.

Figure 8:
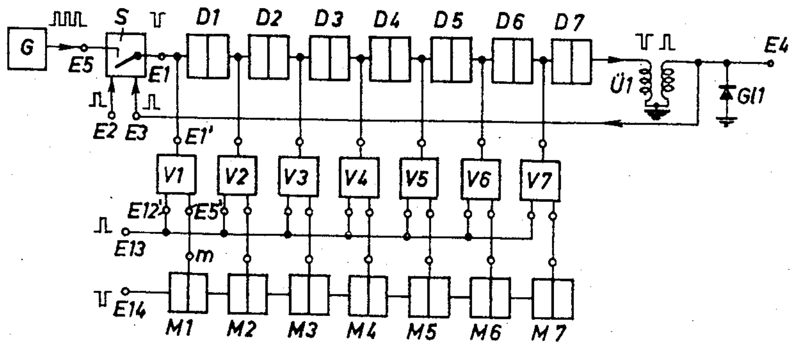
Figs. 8 and 9 illustrate two circuit arrangements embodying the principle illustrated in Fig. 7.

Fig. 8 illustrates a circuit arrangement which permits impulses to be shifted, for example, selectively by from 0 to 100 cycles of the pulse sequence supplied by the pulse generator. It contains an impulse counter comprising seven binary counting stages D1 to D7 along with the elements required for switching, etc., as described herein with reference to the preceding figures. Seven stages are necessary, since six stages would permit a shift by only 63 periods corresponding to $2^6=64$ pulses. The maximum shift for seven stages is 127 cycles, corresponding to $2^7=128$ pulses. Thus, for a range of shifts up to 100 periods, seven stages are required. The input terminals of the seven stages D1 to D7 are connected through switching elements V1 to V7 with special take-off points *m* of stages M1 to M7 of the impulse storing device. These stages M1 to M7 consist of binary counter stages such as that shown, for example, in Fig. 2. The switching circuit shown in Fig. 2 has the take-off points *m* and *m'* respectively connected to the plates of the tubes. Depending on the condition of the switching circuit, the points *m* and *m'* have definite potentials. In the normal position, in which tube R2 is conductive, point *m'* has the higher potential, while in the counting position, in which tube R1 is conductive, the higher potential is at point *m*.

To carry out procedure in which the impulse number differential is entered into the impulse storing device, it is necessary to connect the corresponding switching elements V1, V2, etc. to those special take-off points of stages M1 to M7 which have the positive potential when the switching circuit is in counting position, that is, take-off points *m*. These points are connected to the terminals E5' of switching elements V1 to V7. The latter are further provided with one terminal E12' each. The switching elements V1 to V7 are so designed that both terminals of a switching element must have a positive potential to effect switching-through of this element. The switching elements reverse the polarity of the potentials applied thereto; thus, an impulse fed to terminals E12' is converted into a negative impulse which can be taken off at terminals E1' and is thence fed to the input sides of the seven binary counter stages D1 to D7 so as to set these stages in the same manner as the stages of the impulse storing device are set.

This circuit operates as follows:

First, the impulse number differential is entered at terminal E14 into the impulse storing device comprising the seven binary counter stages M1 to M7. Consequently, each of these stages will occupy a predetermined position, which is evidenced by a predetermined potential at the associated take-off point *m*. Now if a positive impulse is transmitted through the common impulse connection E13 to the terminals E12' of switching elements V1 to V7, then in those stages in which a positive potential exists also at point *m* (indicating the counting position of such stages of the impulse storing device), a negative impulse will appear at the corresponding terminals E1' and will switch the associated counter stage of the impulse counter to counting position, it being assumed that the counter was initially in the normal position. In this manner, the impulse counter is set to the same position as the impulse storing device.

If thereafter the impulse to be time-shifted is fed to the terminal E2 of switch S, this starts the feeding of the impulse counter with pulses from generator G, as previously described, until an output pulse appears at the output E4 of the impulse counter, whereby the feeding of pulses is interrupted. Depending upon how many impulses have been entered into the storing device, it is possible to obtain a time shift by any desired number of periods of the pulse sequence supplied by the generator, between the limits of 0 to 127 periods (corresponding to a counter capacity of 128 impulses).

Figure 9:
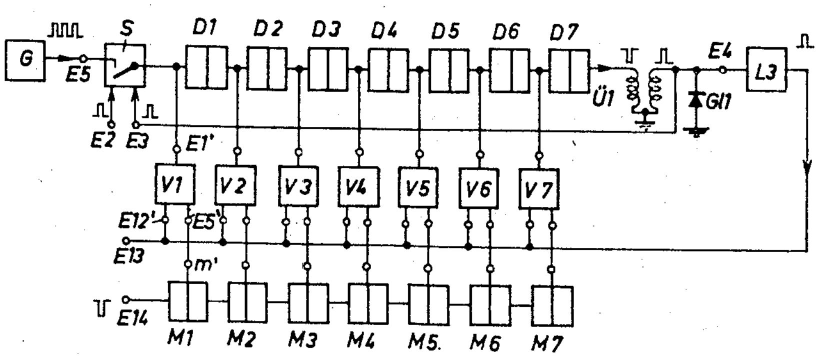

The circuit illustrated in Fig. 9 differs from that shown in Fig. 8 only in that a delaying element L3 is connected to the output E4 of the impulse counter, which has a connection to the common impulse terminal E13, and that the take-off points *m'* of stages M1 to M7 are connected with the terminals E5' of switching elements V1 to V7. In this case, the output pulse, delayed by element L3, initiates the presetting of the impulse counter. This has the result that where impulses to be shifted occur periodically, these impulses will always find the impulse counter properly preset.

As is apparent from the switching circuit of Fig. 2, the plate of tube R1, to which the take-off point *m'* is connected, has the higher potential in the position of rest since the tube is nonconductive in that case. By virtue of the connection of the points *m'* of stages M1 to M7 of the storing device with the switching elements V1 to V7 in the embodiment of Fig. 9, switching-through of these elements has the result that those stages M1 to M7 of the storing device which are in the normal position will act through the associated elements V1 to V7 to switch the corresponding stages of the counter from normal to counting position. Thus, a stage of the storing device which is in the normal position, will switch the corresponding stage of the impulse counter from the normal position to counting position. In this manner, the individual stages of the impulse counter are set to the opposite condition to that in which the corresponding stages of the storing device are set.

Therefore, if it is desired to use this circuit in delaying an impulse by a predetermined number of periods, a number of pulses equal to this number of periods must be fed to the impulse storing device. The resulting setting of the storing device leads to the reverse setting of the impulse counter, whereby the desired time shift is obtained.

For the rest, the operation of the circuit is similar to that of the circuit shown in Fig. 8. The circuit of Fig. 9 merely includes the connection from the delaying element L3 to the common impulse terminal E13 in order repetitively to cause an output pulse of the counter to transmit the reverse of the storing-device setting to the impulse counter and thereby to preset the latter.

The time delay caused by delaying element L3 in the transmission of the output pulse of the impulse counter, is necessary because the presetting of the individual stages of the counter cannot take place at the same moment as these stages are switched over (which initiates the output pulse); but rather, presetting can be effected only after the switching-over operation has been completed in all stages of the impulse counter.

The switching devices V1 to V7 shown in Figs. 8 and 9 may consist of a multiple-grid tube such as that shown at R5 in Fig. 3. The terminals of these switching devices V1 to V7 have been provided with reference characters corresponding to those applied to the terminals of tube R5, but primed. Thus, if tubes such as R5 were used in the place of the switching devices, a potential depending upon the condition of the individual stages of the impulse storing device would be transmitted from each stage M1 to M7 of this storing device to the terminal E5′, that is, to grid G2 of the multiple-grid tube. This potential may be positive or negative. Terminal E12′, that is to say, the grid G1 of tube R5, would receive the impulse initiating the transmission of the condition—or of the reverse of the condition—of the impulse storing device to the impulse counter. Because of the nature of tube R5, this initiating pulse must be of positive polarity; and this indeed applies to a circuit as shown in Fig. 9, since only positive impulses will appear at the output E4 of the impulse counter and be transmitted to the terminals E12′. The transmission-initiating pulse appears at the plate of tube R5, or at terminal E1′, with the opposite, that is, negative, polarity. Such a pulse is adapted to preset the associated stages of the impulse counter in the desired manner.

The impulse counter described above can be used, if desired with the application of the various modifications hereinbefore discussed, for the purpose of creating, pursuant to a first pulse to be time-shifted, an entire new series of pulses whose period duration corresponds to the amount of time shift and whose phase is determined by the first impulse to be time-shifted. To create such a pulse sequence, the time-shifted impulse is fed back to the impulse counter as a new pulse to be time-shifted. This feed-back operation may be subjected to the control of a switching member so that the impulse counter may be employed selectively and at will either for shifting impulses as to time, or for creating a new series of pulses complying with the above conditions.

Figure 10:
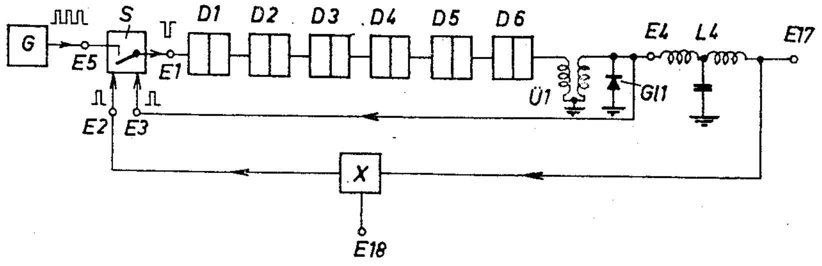
Fig. 10 is a block diagram showing a modification of the circuit shown in Fig. 1.

Fig. 10 illustrates a circuit arrangement operating in accordance with the procedure outlined in the preceding paragraph. The impulse counter constituting the principal part of this arrangement corresponds to that shown in Fig. 1 so that its mode of operation need not again be discussed at this point. In contrast to Fig. 1, the circuit of Fig. 10 shows the output terminal E4 of the impulse counter connected to a timing element L4, the output E17 of which is connected to terminal E2 of the switch S. This connection includes the switching member X which is adapted to be controlled through its terminal E18 in any desired manner, for example by means of a potential or by impulses.

Assuming this circuit to be in the normal position, and assuming that an impulse to be time-shifted is received at terminal E2, this impulse will result, in the manner already described, in an output pulse at E4 that is shifted by an amount governed by the characteristics of the impulse counter and the pulse generator G. This output pulse opens switch S. In addition, it passes through delay line L4, and after a delay determined by the characteristic of this delay line, the impulse passes from the delay line output E17 to terminal E2 of switch S, assuming the switching member X to be switched through. The impulse, which has thus been fed back to terminal E2, there acts like a newly received impulse to be time-shifted and initiates the same sequence of operations as described above. Thus, starting from the moment when the first impulse to be time-shifted arrives, it is possible to take off at output E17 of the delay line L4 a sequence of pulses whose frequency is governed by the time delay resulting from the pulse generator G, the impulse counter, and the delay line L4, while the phase of these pulses is determined by the first incoming pulse to be time-shifted. This sequence of pulses can be taken off at E17 as long as switching member X is closed.

The delay line L4 is required, as the impulse causing closure of switch S must occur later than the impulse opening this switch. If both of these impulses were taken off at the output of the impulse counter, impulses would appear simultaneously at both terminals E2 or E3 of switch S, and the latter could not respond to these impulses.

If the frequency of the series of pulses supplied by the pulse generator is very high and the number of stages in the impulse counter is large, it may happen that the time required for the switching-over of the individual stages becomes substantial and the time-shifted pulses no longer coincide with the corresponding pulses supplied by the pulse generator. In other words, the time-shifted impulse lags behind the corresponding pulse of the generator. As the time lag of the time-shifted impulse relative to the generator pulse cannot be recovered, it is necessary to add to the time lag already incurred a further time delay which is so selected as to bring about phase coincidence between the time-shifted pulse and the generator pulse. This may be accomplished by means of a delay line to which the time-shifted pulses are fed. Since a time-shifted pulse must always occur between two pulses of the generator pulse sequence, the time delay of such a delay line will always be shorter than one period of this pulse sequence. If the time-shifting circuit already includes a delay line, the latter may, of course, be combined with the delay line for compensating for or equalizing the above time differential in a single structural unit. The additional time shift resulting from the above time differential and from the use of the added delay line, which time shift corresponds to at least one period or a whole number of periods of the pulse generator sequence, must, of course, be taken into account in designing the entire arrangement.

What is believed to be new and desired to have protected by Letters Patent is defined in the appended claims.

I claim:

1. In a system for timing impulses, a circuit arrangement for shifting impulses occurring in an impulse series delivered by a generator, by a time interval corresponding to 100 periods of the impulse sequence delivered by the generator, having an impulse counter including six serially connected binary counting stages, means for feeding impulses from said generator to said counter at the instant of occurrence of an impulse to be shifted, a device for repeatedly using said impulse counter for the counting of impulses, in the course of which said binary stages are operated from normal to actuated position thereof, said device comprising a delay line, means responsive to the output impulse delivered by the sixth stage after sixty-four input impulses fed to the counter for connecting the output of the penultimate binary counting stage with said delay line, said delay line effecting shifting by five periods, the next following output impulse from said penultimate binary counting stage which occurs after thirty-two further input impulses fed to said counter being fed to said delay line and the feeding of impulses from said generator to said impulse counter being thereafter interrupted, and means controlled by impulses taken off from said delay line for respectively disconnecting the output of said penultimate counting stage from said delay line and for causing restoration to normal of said last binary stage.

2. A system and device according to claim 1, comprising means for feeding to the impulse counter the shifted impulses taken from a point succeeding the last counting stage.

3. A system and device according to claim 1, comprising a timing element in said delay line for equalizing the time interval by which the shifted impulses differ with respect to the impulses of said impulse generator due to the time required for triggering the individual binary counting stages, the impulses delivered by said delay line coinciding as to time with the impulses delivered by said generator.

4. A system and device according to claim 1, comprising a first switch disposed between said impulse generator and said impulse counter, said first switch being controlled by impulses to be shifted, a further switch responsive to an output impulse of said impulse counter for operatively connecting the input of said delay line with the output of the penultimate binary counting stage and for opening said connection responsive to an impulse taken off from a first tab of said delay line, means for branching off impulses from the input of said delay line for effecting the opening of said first-named switch, a second tab of said delay line disposed ahead of said first tab, and means for connecting said second tab with the input of the last binary counting stage for returning such stage to normal under control of an impulse passing through said delay line.

5. A system and device according to claim 4, comprising binary counting stages each having a trigger circuit for two stable positions and including two tubes, and rectifier means for decoupling the input of said trigger circuit from the preceding switching element.

6. A system and device according to claim 4, wherein each said first and said further switch contains a trigger circuit for two stable positions and including two tubes, means for conducting to the grid of one of said tubes impulses signifying closing and to the grid of the other tube impulses signifying opening, a further tube having a first and a second control grid, means for connecting to said first control grid the anode of one of the first named tubes which is after delivery of an impulse signifying closing more positive, means for feeding to said second grid impulses to be transmitted by the corresponding switch, means for connecting the anode of said further tube with means to which said impulses are to be transmitted, the feed voltages conducted to said tubes being such as to cause said further tube responsive to delivery of an impulse signifying closing of the switch to transmit the impulse conducted to its first grid and to block said switch responsive to an impulse signifying opening thereof.

References Cited in the file of this patent

UNITED STATES PATENTS

| | | |
|---|---|---|
| 2,519,184 | Erosdoff | Aug. 15, 1950 |
| 2,621,854 | Sprague | Dec. 16, 1952 |
| 2,644,887 | Wolfe | July 7, 1953 |
| 2,740,106 | Phelps | Mar. 27, 1956 |
| 2,810,518 | Dillon et al. | Oct. 22, 1957 |
| 2,832,044 | Bliss | Apr. 22, 1958 |

OTHER REFERENCES

High Speed Computing Devices, ERA 1950, pp. 341–354.

Kemp, Guted Decade Counter Requires No Feedback, Electronics (February 1953), pp. 145–147.

Thomason: "A Preset Counter for Time and Quantity Measurements," Tele-Tech and Electronic Industries, August 1953, pp. 82–83, and pp. 210–212.